US012649491B2

(12) United States Patent
Ucar et al.

(10) Patent No.: US 12,649,491 B2
(45) Date of Patent: Jun. 9, 2026

(54) VEHICULAR KNOWLEDGE NETWORKING ASSISTED ADAS CONFIGURATION

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US); Chang-Heng Wang, Mountain View, CA (US)

(73) Assignee: Toyota Motor Engineering and Manufacturing North America, Inc., Plano, TX (US)

( * ) Notice: Subject to any disclaimer, the term of this patent is extended or adjusted under 35 U.S.C. 154(b) by 220 days.

(21) Appl. No.: 17/400,817

(22) Filed: Aug. 12, 2021

(65) Prior Publication Data

US 2023/0051511 A1      Feb. 16, 2023

(51) Int. Cl.
  *G08G 1/09*       (2006.01)
  *B60W 30/09*      (2012.01)
    (Continued)
(52) U.S. Cl.
  CPC ........ *B60W 60/0015* (2020.02); *B60W 30/09* (2013.01); *B60W 30/095* (2013.01); *B60W 40/09* (2013.01); *G06F 18/23* (2023.01)
(58) Field of Classification Search
  CPC .. B60W 60/0015; B60W 30/09; B60W 40/09; G06G 18/23
  See application file for complete search history.

(56) References Cited

U.S. PATENT DOCUMENTS 8,509,982 B2    8/2013  Montemerlo
8,744,675 B2    6/2014  King et al.
        (Continued)

FOREIGN PATENT DOCUMENTS

CN      110366107 A      10/2019
CN      111126144 A      5/2020
        (Continued)

OTHER PUBLICATIONS

Anomaly detection in vehicle traffic with image processing and machine learning (https://www.researchgate.net/publication/328468982_Anomaly_Detection_in_Vehicle_Traffic_with_Image_Processing_and_Machine_Learning), Nov. 7, 2018.
        (Continued)

*Primary Examiner* — Scott A Browne
*Assistant Examiner* — Rami Nabih Bedewi
(74) *Attorney, Agent, or Firm* — DINSMORE & SHOHL LLP

(57)        ABSTRACT

A method includes receiving first data from one or more vehicles in a geographic area, the first data indicating operation of an active safety system by at least one of the one or more vehicles, receiving second data indicating driving performance of the one or more vehicles, determining whether the driving performance of the one or more vehicles in the geographic area is improved or diminished by the use of the active safety system based on the first data and the second data, and transmitting a signal to a vehicle approaching the geographic area to cause the vehicle approaching the geographic area to activate or deactivate the active safety system based on the determination.

11 Claims, 6 Drawing Sheets

(51) Int. Cl.

| | |
|---|---|
| *B60W 30/095* | (2012.01) |
| *B60W 40/09* | (2012.01) |
| *B60W 60/00* | (2020.01) |
| *G06F 18/23* | (2023.01) |
| *G08G 1/00* | (2006.01) |
| *G08G 1/16* | (2006.01) |

(56) References Cited

U.S. PATENT DOCUMENTS

| | | | |
|---|---|---|---|
| 9,308,914 B1 | 4/2016 | Sun et al. | |
| 2007/0265760 A1 | 11/2007 | Konhauser et al. | |
| 2015/0375699 A1* | 12/2015 | Lamprecht | G01C 21/36 |
| | | | 701/2 |
| 2018/0211520 A1* | 7/2018 | Offenhaeuser | G08G 1/0141 |
| 2018/0348755 A1* | 12/2018 | Yamaguchi | G08G 1/0133 |
| 2019/0016340 A1* | 1/2019 | Bae | B60W 30/18109 |
| 2019/0101924 A1 | 4/2019 | Styler et al. | |
| 2019/0337513 A1* | 11/2019 | Kim | B60W 30/12 |
| 2020/0156634 A1* | 5/2020 | Jeong | G07C 5/008 |
| 2020/0233060 A1 | 7/2020 | Lull et al. | |
| 2020/0334554 A1 | 10/2020 | Takahashi et al. | |
| 2021/0039667 A1* | 2/2021 | Molin | G01S 13/867 |
| 2021/0056778 A1 | 2/2021 | Wylie et al. | |
| 2021/0072921 A1 | 3/2021 | Bielby et al. | |
| 2021/0142592 A1 | 5/2021 | Lange et al. | |
| 2021/0142659 A1 | 5/2021 | Chen et al. | |
| 2022/0126832 A1* | 4/2022 | Ewert | B60W 10/24 |
| 2023/0195712 A1* | 6/2023 | Carpentier | G06F 16/23 |
| | | | 707/609 |

FOREIGN PATENT DOCUMENTS

| | | |
|---|---|---|
| JP | 2021043994 A | 3/2021 |
| JP | 7148092 B2 | 9/2022 |
| WO | 2020159961 A1 | 8/2020 |

OTHER PUBLICATIONS

Comparative analysis of machine learning-based approaches for anomaly detection in vehicular data (https://www.mdpi.com/2624-8921/3/2/11/htm), Apr. 25, 2021.

International Search Report and Written Opinion with notification transmittal dated Mar. 1, 2023 in related International Application No. PCT/IB2022/057317 (34 pages total).

Office Action re EP 22757690.7 dated Jan. 2, 2026.

Office Action re JP 2024-508103 dated Feb. 3, 2026.

* cited by examiner

VEHICULAR KNOWLEDGE NETWORKING ASSISTED ADAS CONFIGURATION

TECHNICAL FIELD

The present specification relates to a traffic management system, and more particularly, to vehicular knowledge networking assisted ADAS configuration.

BACKGROUND

Many vehicles in operation are equipped with one or more Advanced Driving Assistance Systems (ADAS). These are electronic systems that may assist a driver in certain driving situations. In particular, an ADAS may use automated technology, such as cameras and other sensors, to detect nearby vehicles or other road agents or events and respond accordingly (e.g., automatically performing a driving action if the driver of the vehicle does not perform an appropriate driving action). Examples of ADAS may include lane tracing assist (LTA), lane departure alert (LDA), pre-collision system, dynamic radar cruise control, road sign assist, anomaly detection/management, and the like.

While an ADAS may be beneficial to a driver in certain driving situations, in other driving situations they may not be beneficial. For example, LTA or LDA may not perform well in an area containing faded or erased lane markers. Accordingly, it may be beneficial to deactivate one or more types of ADAS in certain situations. As such, it may be beneficial for one or more types of ADAS to be activated in certain situations and deactivated in other situations. Thus, there is a need for vehicular knowledge networking assisted ADAS configuration.

SUMMARY

In one embodiment, a method includes receiving first data from one or more vehicles in a geographic area, the first data indicating operation of an active safety system by at least one of the one or more vehicles, receiving second data indicating driving performance of the one or more vehicles, determining whether the driving performance of the one or more vehicles in the geographic area is improved or diminished by the use of the active safety system based on the first data and the second data, and transmitting a signal to a vehicle approaching the geographic area to cause the vehicle approaching the geographic area to activate or deactivate the active safety system based on the determination In another embodiment, a remote computing device includes a controller. The controller may receive first data from one or more vehicles in a geographic area, the first data indicating operation of an active safety system by at least one of the one or more vehicles, receive second data indicating driving performance of the one or more vehicles, determine whether the driving performance of the one or more vehicles in the geographic area is improved or diminished by the use of the active safety system based on the first data and the second data, and transmit a signal to a vehicle approaching the geographic area to cause the vehicle approaching the geographic area to activate or deactivate the active safety system based on the determination In another embodiment, a system includes a vehicle system for a vehicle positioned in a geographic area and a remote computing device. The vehicle system may include one or more vehicle sensors and a controller. The vehicle sensors may gather sensor data about road agents around the vehicle. The controller may transmit the sensor data and data associated with operation of one or more active safety systems of the vehicle to the remote computing device. The remote computing device may receive the sensor data and the data associated with operation of the one or more active safety systems of the vehicle from the vehicle system, determine whether driving performance of the vehicle in the geographic area is improved or diminished by use of an active safety system based on the sensor data and the data associated with the operation of the one or more active safety systems of the vehicle, and transmit a signal to another vehicle approaching the geographic area to cause the another vehicle approaching the geographic area to activate or deactivate the active safety system based on the determination.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
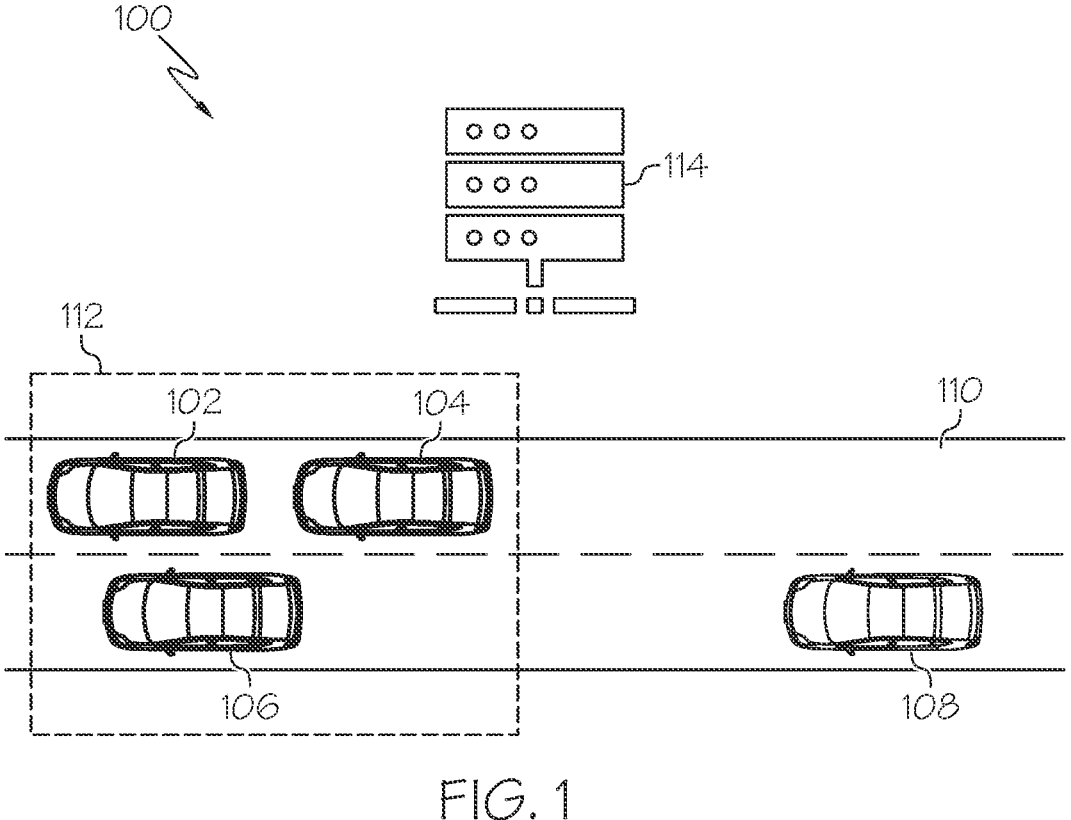
FIG. 1 depicts an example system for performing vehicular knowledge networking assisted ADAS configuration, according to one or more embodiments shown and described herein.

The embodiments disclosed herein include vehicular knowledge networking assisted ADAS configuration. Vehicles may include a variety of different ADAS. Throughout this disclosure, an ADAS may be referred to as an active safety system. Examples of active safety systems may include lane tracing assist (LTA), lane departure alert (LDA), pre-collision system, dynamic radar cruise control, road sign assist, anomaly detection/management, and the like. These active safety systems may acquire data from cameras or other vehicle sensors and may determine a driving event based on the data (e.g., a dangerous driving event).

After detecting a driving event, an active safety system may issue a warning to a driver of the vehicle or may automatically cause the vehicle to perform a driving action based on the detected driving event. For example, an LDA may determine that the vehicle is veering out of its current lane and may either issue a warning to a driver of the vehicle or change the trajectory of the vehicle to ensure that the vehicle stays in the current lane. In another example, a pre-collision system may determine that the vehicle is getting too close to another vehicle or obstacle, which may result in a collision. Accordingly, the pre-collision system may apply the brakes of the vehicle to avoid a collision.

As such, active safety systems may improve driving behavior in many situations. Furthermore, it may be beneficial to ensure that certain active safety systems are activated in advance of a vehicle reaching a particular driving event for which an active safety system can respond. For example, if a vehicle is approaching an icy road, it may be desirable to activate one or more safety systems before the vehicle reaches the icy road, such that the safety systems may assist the driver as soon as the vehicle reaches the icy road.

However, in other situations, certain active safety systems may be detrimental to driving behavior. For example, in a location where lane lines are faded or erased, LTA and LDA systems may not function properly. If these systems are active in such a location, they may cause a vehicle to drive erratically since vehicle sensors may be unable to properly detect lane lines, which LTA and LDA systems may use to operate. Accordingly, in this type of situation, it may be desirable to deactivate one or more safety systems before the vehicle reaches a certain location containing faded or erased lane lines.

In embodiments disclosed herein, one or more vehicles driving in a particular geographic area may utilize certain active safety systems to assist with driving. The vehicles may transmit data about the use of active safety systems to a server. The server may receive the data about the use of active safety systems by the vehicles and may also receive data about the driving performance of the vehicles as well as other vehicles that may not be utilizing certain active safety systems.

The server may utilize the received data to determine whether the use of certain active safety systems improve or diminish driving performance of vehicles using the active safety systems. If the server determines that the use of a particular active safety system improves driving performance in the geographic area, the server may transmit a signal to other vehicles approaching the geographic area, which may cause the particular active safety system that improves driving performance in the geographic area to be activated. Alternatively, if the server determines that the use of a particular active safety system diminishes driving performance in the geographic area, the server may transmit a signal to other vehicles approaching the geographic area, which may cause the particular active safety system that diminishes driving performance in the geographic area to be deactivated. Thus, vehicles approaching the geographic area can either activate or deactivate active safety systems to improve driving performance upon reaching the geographic area.

Here, the server learns knowledge regarding whether to activate or deactivate a particular active safety system in a predetermined area based on information obtained from data collected by vehicles. The data collected by vehicles may include, for example, the speeds of the vehicles, positions of the vehicle, safety systems being activated, and the information may include that vehicle A is traveling in area X with safety system J being activate and vehicle B is traveling in area X with safety system J being deactivated. Based on the learned knowledge, the server instructs other vehicles approaching the predetermined area to activate or deactivate the particular active safety system.

Turning now to the figures, FIG. 1 shows a system 100 for operating a vehicular knowledge networking assisted ADAS configuration. The system 100 includes a plurality of vehicles 102, 104, 106, and 108 driving along a road 110.

The vehicles 102, 104, and 106 are positioned within a geographic area 112 and the vehicle 108 is approaching the geographic area 112. While the example of FIG. 1 shows three vehicles positioned within the geographic area 112 and one vehicle positioned outside of the geographic area 112, it should be understood that in other examples, any number of vehicles may be positioned within the geographic area 112 and any number of vehicles may be positioned outside of and approaching the geographic area 112. The system 100 also includes a server or remote computing device 114.

In the example of FIG. 1, one or more of the vehicles 102, 104, 106, and 108 may be connected vehicles. A connected vehicle is able to communicate remotely with systems outside of the vehicle (e.g., a traffic management system or other vehicles). In particular, in the example of FIG. 1, a connected vehicle may communicate with the server 114. Each of the connected vehicles 102, 104, 106, and 108 may be a vehicle including an automobile or any other passenger or non-passenger vehicle such as, for example, a terrestrial, aquatic, and/or airborne vehicle. In some embodiments, one or more of the connected vehicles 102, 104, 106, and 108 may be an unmanned aerial vehicle (UAV), commonly known as a drone.

The server 114 may be communicatively coupled to the vehicles 102, 104, 106, and 108. In the illustrated example, the server 114 comprises a cloud computing device. In some examples, the server 114 may comprise a road-side unit (RSU) positioned near the road 110. In these examples, the system 100 may include any number of RSUs spaced along the road 110 such that each RSU covers a different service area. That is, as the vehicles 102, 104, 106, 108 or other vehicles drive along the road 110, the vehicles may be in range of different RSUs at different times such that different RSUs provide coverage at different locations. Thus, as vehicles drive along the road 110, the vehicles may move between coverage areas of different RSUs.

In other examples, the server 114 may be another type of server or remote computing device and may be positioned remotely from the road 110. In some examples, the server 114 may be an edge server. In some examples, the server 114 may be a moving edge server, such as another vehicle.

In the example of FIG. 1, the vehicles 102, 104, and 106 may transmit data to the server 114. As disclosed herein, the data transmitted from the vehicles 102, 104, and 106 to the server 114 may include data gathered by vehicle sensors, which the server 114 may use to determine locations, speeds, trajectories, and other information about vehicles and other road objects positioned or traveling along the road 110. The vehicles 102, 104, and 106 may also transmit data to the server 114 indicating the activation and/or operation of active safety systems, as disclosed in further detail below.

Figure 2:
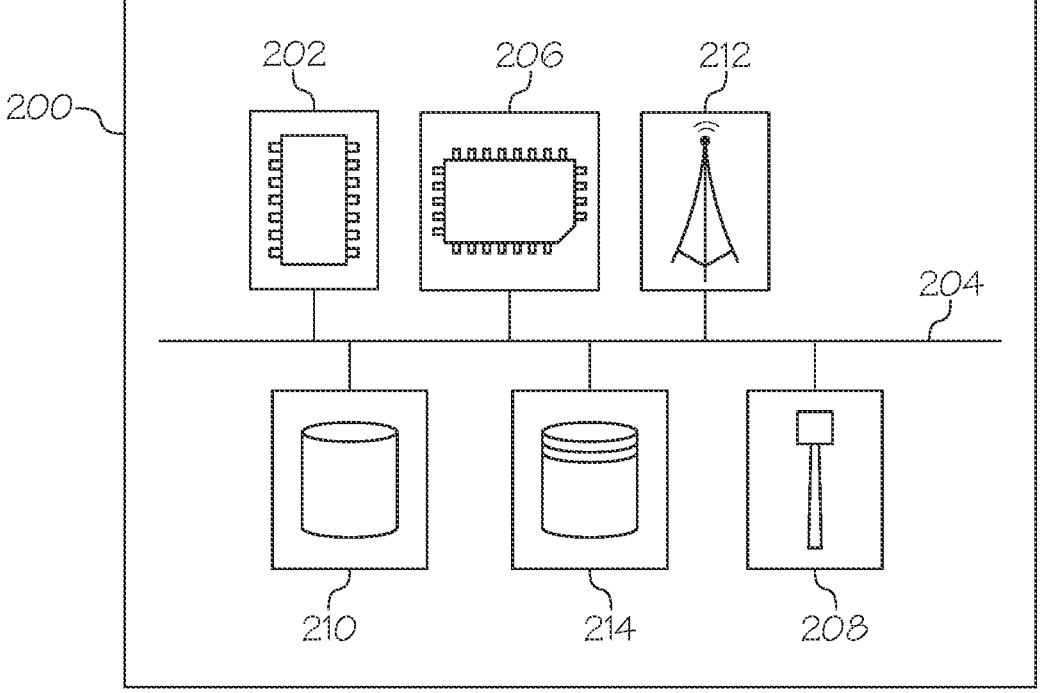
FIG. 2 schematically depicts an example vehicle system, according to one or more embodiments shown and described herein.

FIG. 2 depicts a vehicle system 200 that may be included in one or more of the vehicles 102, 104, 106, and/or 108 of FIG. 1. The vehicle system 200 may represent a vehicle system included in an autonomous vehicle, a semi-autonomous vehicle, or a human-driven vehicle. However, certain components of the vehicle system 200 of FIG. 2 may not be included in certain vehicle types in some examples, as disclosed herein.

In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

In embodiments, the memory modules 206 may comprise one or more active safety systems, as disclosed herein. An active safety system may be activated or deactivated. When an active safety system is activated, the active safety system receives sensor data and detects particular driving conditions or events (e.g., dangerous driving conditions). Different active safety systems may detect different driving conditions or events. For example, an LDA system may detect when a vehicle is departing from a lane and a pre-collision system may determine that an imminent collision is likely. Upon detection of a particular driving event, the active safety system may trigger and may issue a warning to a driver and/or cause a driving action to take place in order to deal with the detected driving condition. For example, when an LDA system is triggered, it may alert the driver that the vehicle is departing from a lane. When a pre-collision system is triggered, it may apply the brakes of the vehicle in order to avoid a collision.

If an active safety system is deactivated, the active safety system does not operate. In embodiments disclosed herein, the server 114 may transmit a signal to a vehicle to cause an active safety system to be activated or deactivated, as disclosed in further detail below. In some examples, the server 114 may transmit a signal suggesting that an active safety system be activated or deactivated. In these examples, upon receiving such a signal from the server 114, a vehicle system may display a message to a driver of the vehicle indicating the suggestion to activate or deactivate a safety system and the driver may decide whether to activate or deactivate a safety system based on the suggestion.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. In embodiments, the vehicle sensors 210 may monitor the surroundings of the vehicle and may detect other road objects such as other vehicles, pedestrians, obstacles, traffic signs, and the like. The data captured by the vehicle sensors 210 may be processed by the processors 202 to determine locations, speeds, trajectories, and other information about vehicles and other road objects.

For autonomous vehicles, the vehicle system 200 may include an autonomous driving module and the data gathered by the vehicle sensors 210 may be used by the autonomous driving module to autonomously navigate the vehicle.

Still referring to FIG. 2, the vehicle system 200 comprises network interface hardware 212 for communicatively coupling the vehicle system 200 to the server 114. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol.

In embodiments, the network interface hardware 212 of the vehicle system 200 may transmit data gathered by the vehicle sensors 210 to the server 114. This sensor data may comprise information about other vehicles on the road. The network interface hardware 212 may also transmit data about the vehicle itself (e.g., position, speed, and trajectory of the vehicle). The server 114 may receive the sensor data and the data about the vehicle and may determine driving behavior of vehicles, as described in further detail below.

The network interface hardware 212 may also transmit active safety system operation data, which may comprise information about the operation of one of more active safety systems of the vehicle. For example, the network interface hardware 212 may transmit information about whether an active safety system is activated or deactivated. The network interface hardware 212 may transmit information about specific operations of an active safety system (e.g., when an active safety system is triggered and what driving actions it causes the vehicle to perform).

Still referring to FIG. 2, the vehicle system 200 comprises a data storage component 214. The data storage component 214 may store data used by various components of the vehicle system 200. In addition, the data storage component 214 may store data gathered by the vehicle sensors 210.

In some embodiments, the vehicle system 200 may be communicatively coupled to the server 114 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
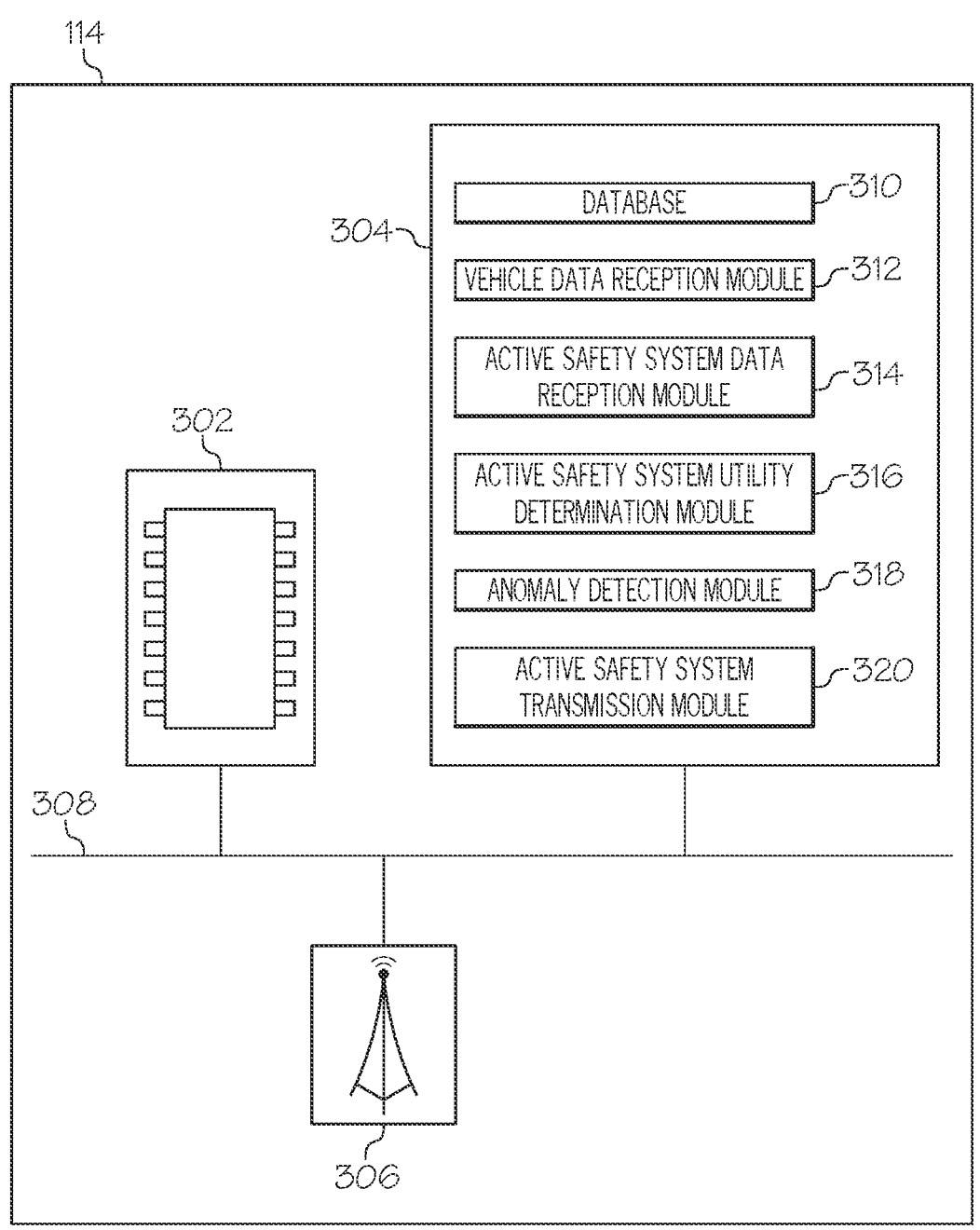
FIG. 3 schematically depicts an example server of the system of FIG. 1, according to one or more embodiments shown and described herein.

Now referring to FIG. 3, the server 114 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. In some examples, the network interface hardware 306 may include two different channels including a Dedicated Short-Range Communication (DSRC) channel and a millimeter wave radio channel, as discussed in further detail below. The network interface hardware 306 of the server 114 may transmit and receive data to and from vehicles (e.g., the vehicles 102, 104, 106, 108 of FIG. 1).

The one or more memory modules 304 include a database 310, a vehicle data reception module 312, an active safety system data reception module 314, an active safety system utility determination module 316, an anomaly detection module 318, and an active safety system transmission module 320. Each of the database 310, the vehicle data reception module 312, the active safety system data reception module 314, the active safety system utility determination module 316, the anomaly detection module 318, and the active safety system transmission module 320 may be a program module in the form of operating systems, application program modules, and other program modules stored in the one or more memory modules 304. In some embodiments, the program module may be stored in a remote storage device that may communicate with the server 114. In some embodiments, one or more of the database 310, the vehicle data reception module 312, the active safety system data reception module 314, the active safety system utility determination module 316, the anomaly detection module 318, and the active safety system transmission module 320 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 310 may temporarily store sensor data and/or active safety system operation data received from vehicles (e.g., the vehicles 102, 104, 106 of FIG. 1). The database 310 may also store other data that may be used by the memory modules 304 and/or other components of the server 114.

The vehicle data reception module 312 may receive sensor data from one or more connected vehicles (e.g., the vehicles 102, 104, 106 of FIG. 1). In particular, the vehicle data reception module 312 may receive sensor data captured by connected vehicles that may indicate locations, speeds, trajectories, and/or other information about vehicles or road agents. Accordingly, the server 114 may analyze driving performance of the connected vehicles and other vehicles on the road based on the received sensor data, as disclosed in further detail below.

The active safety system data reception module 314 may receive data from one or more connected vehicles (e.g., the vehicles 102, 104, 106 of FIG. 1) regarding the use of active safety systems on the vehicles. The data received by the active safety system data reception module 314 may include whether a particular active safety system is activated or deactivated, and details about the operation of active safety systems. For example, the active safety system data reception module 314 may receive data indicating when particular active safety systems are triggered and what driving actions the active safety systems cause vehicles to make when triggered. The server 114 may utilize the data received by the vehicle data reception module 312 and the active safety system data reception module 314 to determine whether a vehicle's driving performance is improved or diminished by use of an active safety system, as explained in further detail below.

The active safety system utility determination module 316 may determine whether driving performance of one or more vehicles is improved or diminished by use of an active safety system in a particular geographic area, as disclosed herein. As discussed above, the vehicle data reception module 312 may receive sensor data from connected vehicles, which may indicate driving behavior of vehicles in a particular geographic area. The data received by the vehicle data reception module 312 may indicate driving behavior of both connected vehicles and non-connected vehicles.

Also as discussed above, the active safety system data reception module 314 may receive data about the use of active safety systems by one or more connected vehicles. As such, the data received by the active safety system data reception module 314 may indicate which vehicles in a particular geographic area have certain active safety systems activated and which vehicles in the geographic area have certain active safety systems deactivated.

Neither the vehicle data reception module 312, nor the active safety system data reception module 314 receive data from non-connected vehicles. However, the sensor data received by the vehicle data reception module 312 may include sensor data captured by connected vehicles about non-connected vehicles. Accordingly, the data received by the vehicle data reception module 312 may indicate driving behavior of non-connected vehicles. In some examples, it is presumed that non-connected vehicles do not have any active safety systems. As such, the active safety system utility determination module 316 may compare the driving performance in a particular geographic area of vehicles that have a particular active safety system activated and vehicles that do not have the active safety system activated (either connected vehicles that have the active safety system deactivated or non-connected vehicles), as disclosed herein.

Based on the data received by the vehicle data reception module 312 and the data received by the active safety system data reception module 314, the active safety system utility determination module 316 may determine whether driving performance of vehicles is improved or diminished by the use of an active safety system in a particular geographic area. In one example, the active safety system utility determination module 316 may determine whether vehicles that have an active safety system activated or vehicles that have an active safety system deactivated perform abnormal driving behavior in the geographic area.

Figure 4:
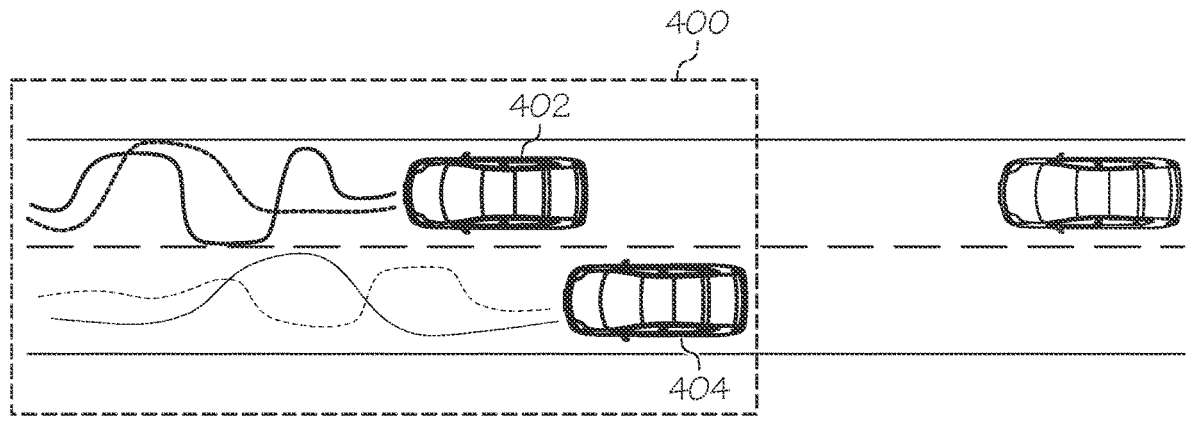
FIG. 4 depicts an example use case of the system of FIG. 1, according to one or more embodiments shown and described herein.

If vehicles that have an active safety system activated in a geographic area perform abnormal driving in the geographic area, the active safety system utility determination module 316 may determine that use of the active safety system in the geographic area diminishes driving performance. For example, FIG. 4 shows two vehicles 402 and 404 driving within a geographic area 400. In the example of FIG. 4, the vehicles 402 and 404 have lane tracing assist and lane departure alert systems activated. However, in the example of FIG. 4, there are some erased lane markers in the geographic area 400. Accordingly, the vehicles 402 and 404 exhibit abnormal driving behavior (e.g., swerving behavior) because the LTA and LDA systems are unable to track the lane markers.

In the example of FIG. 4, the active safety system utility determination module 316 may analyze the trajectories of the vehicles 402 and 404 based on data received by the vehicle data reception module 312. In some examples, the active safety system utility determination module 316 may use machine learning and/or time-series analysis to analyze vehicles trajectories. Based on the analysis of vehicle trajectories, the active safety system utility determination module 316 may determine that the vehicles are performing abnormal driving behavior. Accordingly, in the example of FIG. 4, the active safety system utility determination module 316 may determine that use of LTA and LDA systems diminishes driving performance in the geographic area 400.

Alternatively, if vehicles that have an active safety system deactivated in a geographic area perform abnormal driving behavior in the geographic area, the active safety system utility determination module 316 may determine that use of the active safety system in the geographic area improves driving performance. For example, drivers may tend to lose their attentiveness in a particular geographic area and perform abnormal driving behavior without assistance from an active safety system.

The active safety system utility determination module 316 may utilize a variety of techniques to determine whether a vehicle is performing abnormal driving behavior. For example, the active safety system utility determination module 316 may determine how well a vehicle stays centered inside a lane or how consistent a vehicle's speed remains.

In some examples, the active safety system utility determination module 316 may compare the driving performance of vehicles in a geographic area that have a particular active safety system activated to the driving performance of vehicles in the geographic area that have the same active safety system deactivated. If the driving performance of the vehicles with the active safety system activated is better than the driving performance of the vehicles with the active safety system deactivated, then it may be determined that driving performance in the geographic area is improved by the use of the active safety system. Alternatively, if the driving performance of the vehicles with the active safety system deactivated is better than the driving performance of the vehicles with the active safety system activated, then it may be determined that driving performance in the geographic area is diminished by the use of the active safety system.

Referring back to FIG. 3, the anomaly detection module 318 may detect an anomaly based on data received by the vehicle data reception module 312 and data received by the active safety system data reception module 314. An anomaly may be an extrinsic anomaly or an intrinsic anomaly. An extrinsic anomaly is an anomaly created by road or environmental conditions, such as potholes, lane closures, or inclement weather. An intrinsic anomaly is an anomaly created by driving behavior, such as drunk driving or distracted driving. Anomalies can adversely affect driving conditions and degrade driving performance. Accordingly, detecting anomalies can allow drivers approaching an anomaly to take precautions to mitigate the effects of the anomaly.

Figure 5:
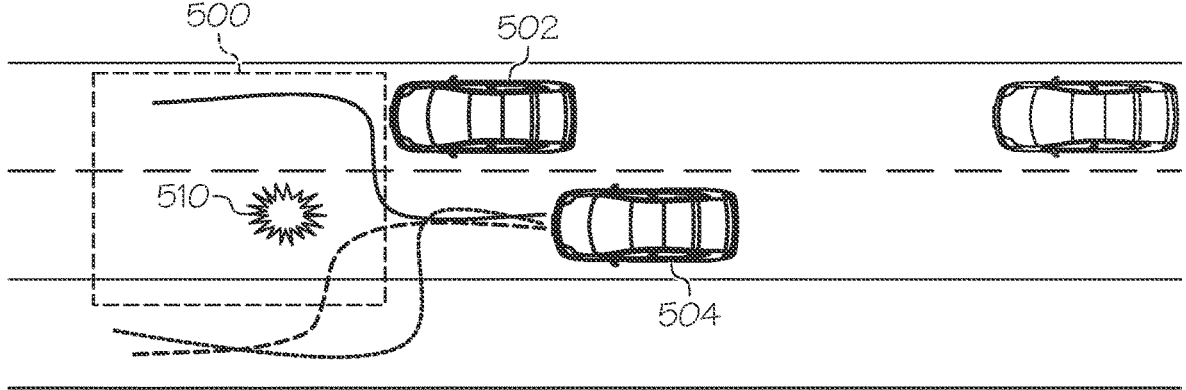
FIG. 5 depicts another example use case of the system of FIG. 1, according to one or more embodiments shown and described herein.

The anomaly detection module 318 may detect an anomaly by analyzing driving behavior of vehicles based on data received by the vehicle data reception module 312 and operation of active safety systems based on data received by the active safety system data reception module 314. For example, FIG. 5 shows a geographic area 500 along a road that contains a pothole 510. In the example of FIG. 5, the anomaly detection module 318 may detect that vehicles that have a pre-collision system activated when driving in the geographic area 500 typically trigger the pre-collision system and perform a lane change immediately after the pre-collision system is triggered, just before reaching the location of the pothole 510. Accordingly, the anomaly detection module 318 may determine that an extrinsic anomaly exists at the location of the pothole 510.

In other examples, the anomaly detection module 318 may utilize machine learning, time-series analysis, and/or clustering algorithms to detect anomalies based on data received by the vehicle data reception module 312 and data received by the active safety system data reception module 314. In some examples, the anomaly detection module 318 may detect patterns of vehicle behavior (e.g., the lane change behavior discussed above), and may identify and classify anomalies (e.g., as extrinsic or intrinsic) based on any detected patterns.

Referring back to FIG. 3, the active safety system transmission module 320 may transmit a signal to one or more vehicles to cause an active safety system of the vehicle to activate or deactivate based on determinations made by the active safety system utility determination module 316 and/or the anomaly detection module 318, as disclosed herein.

If the active safety system utility determination module 316 determines that use of a particular active safety system improves driving performance in a geographic area, then the active safety system transmission module 320 may transmit a signal to vehicles approaching the geographic area to cause those vehicles to activate that particular active safety system. For instance, in the example of FIG. 1, if the active safety system utility determination module 316 determines that driving performance is improved in the geographic area 112 by use of lane tracing assist, then the active safety system transmission module 320 may transmit a signal to the vehicle 108 approaching the geographic area 112 that causes the vehicle 108 to activate its lane tracing assist system.

If the active safety system utility determination module 316 determines that use of a particular active safety system diminishes driving performance in a geographic area, then the active safety system transmission module 320 may transmit a signal to vehicles approaching the geographic area to cause those vehicles to deactivate that particular active safety system. For instance, in the example of FIG. 1, if the active safety system utility determination module 316 determines that driving performance is diminished in the geographic area 112 by use of lane departure alerts, then the active safety system transmission module 320 may transmit a signal to the vehicle 108 approaching the geographic area 112 that causes the vehicle 108 to deactivate its lane departure alert system.

If the anomaly detection module 318 detects an anomaly in a geographic area, then the active safety system transmission module 320 may transmit a signal to vehicles approaching the geographic area to cause those vehicles to activate a particular active safety system that may best help the vehicle navigate and/or avoid the anomaly. The particular active safety system to be activated may be based on a classification of the anomaly determined by the anomaly detection module 318. For instance, in the example of FIG. 1, if the anomaly detection module 318 determines that an extrinsic anomaly is present in the geographic area 112, the active safety system transmission module 320 may transmit a signal to the vehicle 108 approaching the geographic area 112 that causes the vehicle 108 to activate a pre-collision system and/or anomaly detection system.

In the illustrated example, the active safety system transmission module 320 may transmit a signal to a vehicle to cause a particular active safety system of the vehicle to be activated or deactivated. However, in some examples, the active safety system transmission module 320 may transmit a signal to a vehicle that causes a message or warning to be displayed or otherwise communicated to the driver of the vehicle suggesting that a particular active safety system of the vehicle be activated or deactivated. In these examples, the driver may decide whether to manually activate or deactivate the suggested active safety system.

Figure 6:
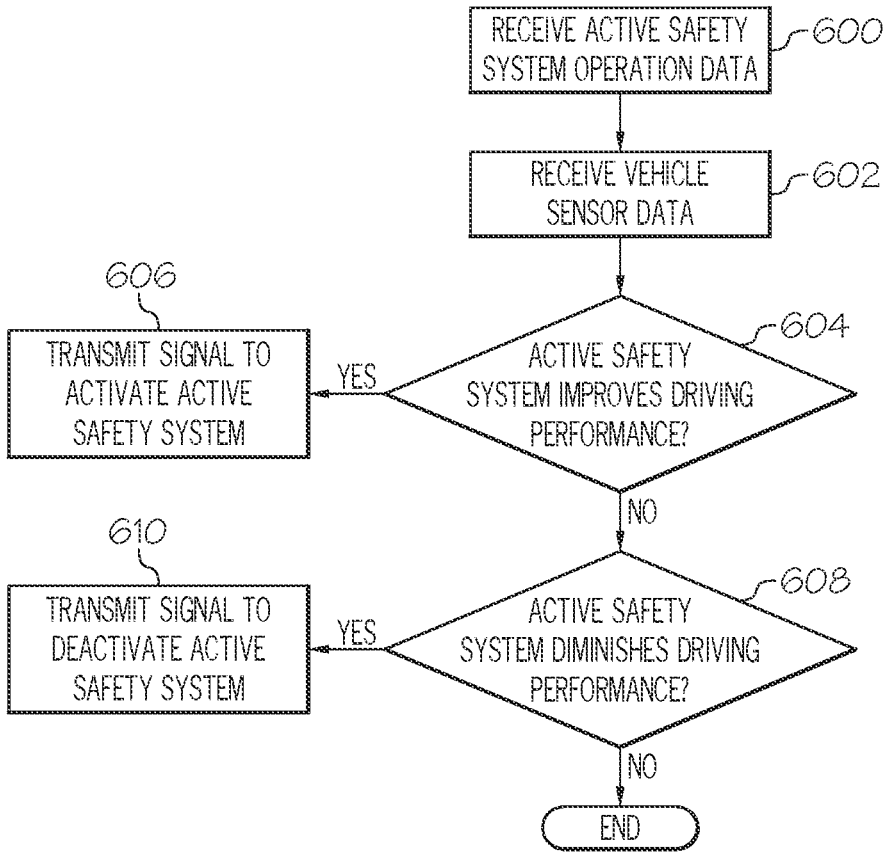
FIG. 6 depicts a flowchart for a method that may be implemented by the system of FIG. 1, according to one or more embodiments shown and described herein.

FIG. 6 depicts a flowchart for a method that may be implemented by the server 114 to perform vehicular knowledge networking assisted ADAS configuration. At step 600, the active safety system data reception module 314 receives active safety system operation data from one or more connected vehicles in a geographic area. The active safety system operation data may indicate what active safety system on a connected vehicle are activated and deactivated, when an activated safety system triggers, and what driving action an active safety system causes a vehicle to perform when it is triggered.

At step 602, the vehicle data reception module 312 receives vehicle sensor data from one or more connected vehicles in the geographic area. The vehicle sensor data may comprise data gathered by sensors of the one or more connected vehicles in the geographic area. The vehicle sensor data may indicate positions, speeds, trajectories, and other information about connected vehicles and non-connected vehicles in the geographic area.

At step 604, the active safety system utility determination module 316 determines whether use of an active safety system improves driving performance in the geographic area. In some examples, this determination may be made by determining whether a vehicle that does not use the active safety system performs abnormal driving behavior in the geographic area. In some examples, this determination may be made by comparing driving behavior of vehicles that utilize the active safety system in the geographic area to driving behavior of vehicles that do not utilize the active safety system in the geographic area.

If the active safety system utility determination module 316 determines that use of an active safety system in the geographic area improves driving performance (yes at step 604), then control passes to step 606. At step 606, the active safety system transmission module 320 transmits a signal to a connected vehicle approaching the geographic area to cause the connected vehicle to activate the active safety system.

If the active safety system utility determination module 316 determines that use of the active safety system in the geographic area does not improve driving performance (no at step 604), then control passes to step 608. At step 608, the active safety system utility determination module 316 determines whether use of the active safety diminishes driving performance in the geographic area. In some examples, this determination may be made by determining whether a vehicle that uses the active safety system performs abnormal driving behavior in the geographic area. In some examples, this determination may be made by comparing driving behavior of vehicles that utilize the active safety system in the geographic area to driving behavior of vehicles that do not utilize the active safety system in the geographic area.

If the active safety system utility determination module 316 determines that use of the active safety system in the geographic area diminishes driving performance (yes at step 608), then control passes to step 610. At step 610, the active safety system transmission module 320 transmits a signal to a connected vehicle approaching the geographic area to cause the connected vehicle to deactivate the active safety system.

If the active safety system utility determination module 316 determines that use of the active safety system in the geographic area does not diminish driving performance (no at step 608), then the method of FIG. 6 ends. That is, if the active safety system utility determination module 316 determines that use of the active safety system in the geographic area neither improves nor diminishes driving performance, then the active safety system transmission module 320 does not transmit a signal to vehicles approaching the geographic area to either activate or deactivate the active safety system.

It should now be understood that embodiments described herein are directed to vehicular knowledge networking assisted ADAS configuration. In embodiments, a plurality of connected vehicles may drive along a road in a particular geographic area. The connected vehicles may transmit sensor data and active safety system operation data to a server. The sensor data may indicate driving data about vehicles and the active safety system operation data may indicate data about the activation, deactivation, and use of one or more active safety systems.

The server may receive the sensor data and the active safety system operation data. Based on the sensor data and the active safety system operation data, the server may determine whether driving performance is improved or diminished by use of a particular active safety system in the geographic area. If use of the active safety system improves driving performance in the geographic area, the server may transmit a signal to connected vehicles approaching the geographic area to cause the vehicles to activate the active safety system. If use of the active safety system diminishes driving performance in the geographic area, the server may transmit a signal to connected vehicles approaching the geographic area to cause the vehicles to deactivate the active safety system. Accordingly, vehicles approaching the geographic area may either activate or deactivate an active safety system so that the vehicles are best prepared to handle the driving conditions of the geographic area.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:

receiving first data from a first vehicle in a geographic area, the first data indicating deactivation of an active safety system by the first vehicle;

receiving second data indicating trajectories of the first vehicle in the geographic area;

determining, based on the first data and the second data, whether the first vehicle performs swerving behavior in the geographic area during deactivation of the active safety system;

upon determination that the first vehicle performs the swerving behavior during the deactivation of the active safety system, determining that use of the active safety system in the geographic area improves driving performance;

transmitting a signal to a vehicle approaching the geographic area to cause the vehicle approaching the geographic area to activate or deactivate the active safety system based on the determination; and after activating the active safety system, detecting, by the active safety system, a driving event, and causing, by the active safety system, the vehicle approaching the geographic area to perform a driving action based on the driving event.

2. The method of claim 1, further comprising:

upon determination that the driving performance of the first vehicle is improved by the use of the active safety system, transmitting the signal to the vehicle approaching the geographic area to cause the vehicle approaching the geographic area to activate the active safety system.

3. The method of claim 1, further comprising:

upon determination that the driving performance of the first vehicle is diminished by the use of the active safety system, transmitting the signal to the vehicle approaching the geographic area to cause the vehicle approaching the geographic area to deactivate the active safety system.

4. The method of claim 1, further comprising:

identifying an anomaly based on the first data and the second data.

5. The method of claim 4, further comprising:

identifying the anomaly using a clustering algorithm.

6. A remote computing device comprising a controller configured to:

receive first data from a first vehicle in a geographic area, the first data indicating deactivation of an active safety system by the first vehicle;

receive second data indicating trajectories of the first vehicle in the geographic area;

determine, based on the first data and the second data, whether the first vehicle performs swerving behavior in the geographic area during deactivation of the active safety system;

upon determination that the first vehicle performs the swerving behavior during the deactivation of the active safety system, determine that use of the active safety system in the geographic area improves driving performance;

transmit a signal to a vehicle approaching the geographic area to cause the vehicle approaching the geographic area to activate or deactivate the active safety system based on the determination; and after activating the active safety system, detect, by the active safety system, a driving event, and cause, by the active safety system, the vehicle approaching the geographic area to perform a driving action based on the driving event.

7. The remote computing device of claim 6, wherein the controller is further configured to:

upon determination that the driving performance of the first vehicle is improved by the use of the active safety system, transmit the signal to the vehicle approaching the geographic area to cause the vehicle approaching the geographic area to activate the active safety system.

8. The remote computing device of claim 6, wherein the controller is further configured to:

upon determination that the driving performance of the first vehicle is diminished by the use of the active safety system, transmit the signal to the vehicle approaching the geographic area to cause the vehicle approaching the geographic area to deactivate the active safety system.

9. The remote computing device of claim 6, wherein the controller is further configured to:

identify an anomaly based on the first data and the second data.

10. The remote computing device of claim 9, wherein the controller is further configured to:

identify the anomaly using a clustering algorithm.

11. A system comprising:

a vehicle system for a vehicle positioned in a geographic area; and a remote computing device;

wherein the vehicle system comprises:

one or more vehicle sensors to gather sensor data about road agents around the vehicle; and a controller configured to transmit the sensor data and data associated with operation of one or more active safety systems of the vehicle to the remote computing device; and wherein the remote computing device is configured to:

receive the sensor data and the data associated with deactivation of the one or more active safety systems of the vehicle from the vehicle system;

determine, based on the sensor data, whether the vehicle performs swerving behavior in the geographic area during deactivation of the one or more active safety systems;

upon determination that the vehicle performs the swerving behavior during the deactivation of the one or more active safety systems, determine that use of the one or more active safety systems in the geographic area improves driving performance;

transmit a signal to another vehicle approaching the geographic area to cause the another vehicle approaching the geographic area to activate or deactivate the one or more active safety systems based on the determination; and after activating the active safety system, detect, by the active safety system, a driving event, and cause, by the active safety system, the vehicle approaching the geographic area to perform a driving action based on the driving event.

* * * * *